United States Patent [19]

Meland et al.

[11] 4,301,523
[45] Nov. 17, 1981

[54] MEASUREMENT AND COMPENSATION SYSTEM FOR BEAM FORMING ARRAY

[75] Inventors: Clifford L. Meland; Newell O. Booth, both of San Diego, Calif.

[73] Assignee: The United States of America as represented by the Secretary of the Navy, Washington, D.C.

[21] Appl. No.: 157,134

[22] Filed: Jun. 6, 1980

[51] Int. Cl.³ .............................................. G01S 3/82
[52] U.S. Cl. .................................... 367/123; 367/19; 367/130
[58] Field of Search ..................... 367/13, 19, 20, 130, 367/106, 123

[56] References Cited

U.S. PATENT DOCUMENTS 4,068,208  1/1978  Rice, Jr. et al. ...................... 367/19
4,231,111 10/1980  Neeley ................................. 367/19

Primary Examiner—Richard A. Farley
Attorney, Agent, or Firm—Richard S. Sciascia; Ervin F. Johnston; James O. Skarsten

[57] ABSTRACT

Apparatus for determining the bearing of an acoustic source from a selected location in an acoustic environment includes a plurality of discrete acoustic sensor elements and a flexible member, having first and second ends, which may be deployed in a linear configuration in the environment. The sensor elements are attached along the flexible member in spaced apart relationship, one of the elements, comprising a lead element, being closer to the first end than any of the other elements. A motion measuring device is coupled to the lead element when the flexible member is deployed in the environment to generate signals which indicate the velocity of the lead sensor element in the environment. A processor, having an input which is limited to lead element velocity signals, generates estimates of the positions of respective sensor elements when the flexible member is deployed in the environment at the selected location, and beam steering equipment, coupled to the processor steers an acoustic detection beam in response to the position estimates to determine the bearing of the acoustic signal source, the acoustic detection beam comprising the combined detection capabilities of the sensor elements.

12 Claims, 4 Drawing Figures

MEASUREMENT AND COMPENSATION SYSTEM FOR BEAM FORMING ARRAY

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The invention disclosed and claimed herein pertains generally to the field of acoustic signal source detection, by means of a beam forming array comprising an interconnection of discrete acoustic sensor elements. More particularly, the invention pertains to the above field wherein it is essential to know the positions of respective sensor elements in order to accurately interpret data provided by the element array. Even more particularly, the invention pertains to a system in the above field which periodically samples the velocity of the leading element of a beam forming array as the array moves through an acoustic environment, such velocity samples being employed by a processor, along with array drag forces, to determine array element positions.

Flexible linear arrays of acoustic sensor elements, such as hydrophones or the like, are extensively used in an acoustic environment such as an ocean body to locate the position or bearing of an acoustic signal source contained therein, and also to provide signal-noise gain in an acoustic detection system. Such arrays generally comprise a number of sensor elements which are joined together by flexible cable or the like at regular intervals, and which are selectively moved through the environment, reception capabilities of individual sensor elements together forming a beam or search pattern. In order to beam form, i.e., to process signals to determine the bearing of a signal source and to provide signal-to-noise gain, it is essential to know the positions of array elements in relation to one another. In the past, such information has been provided by making the assumption that the array is in a linear configuration, whereupon the positions of the elements in relation to one another is easy to determine.

As is well known in the art, the above assumption is often invalid, such as when the array or vessel is exposed to strong lateral currents or winds, or when a portion of the array sinks to a lower depth than another portion thereof, or when the vessel is not on a straight path. If the actual positions of the sensor elements are sufficiently different from the positions which are respectively assumed therefor during beam forming, the signal-to-noise gain in the beam forming process may not be adequate for target source detection or for calculation of target source bearing in an environment which contains a great deal of noise.

In order to determine the actual positions of the elements of a linear array at present, a high frequency pinger or the like may be located in proximity to the array, and the time delays in pinger signal detection may be compared for each of the elements. However, the use of such active signal devices may be undesirable where there is a possibility that the pinger signals will be detected by one for whom they are not intended. Also, it is necessary to know the location of the pinger. Alternatively, speed and heading sensors may be placed at each of the elements along an array, and information provided thereby used to estimate respective element positions. However, in an array having a length which is on the order of a mile, a large number of such sensors must be distributed along the array, creating substantial maintenance and calibration problems.

In the present invention, a single speed sensor device and a single heading sensor are provided to periodically sample the speed and heading of the leading element of a line array of acoustic sensor elements, as the array is drawn through an acoustic environment. Such information is coupled to a processor and employed thereby, together with various parameters prestructured into the processor, to closely approximate respective sensor element positions at the end of each sampling interval. It is anticipated that the differences between actual and estimated positions of respective elements will decrease as the number of sampling intervals increases. It is further anticipated that such differences can be reduced to within a limit which enables the array to be used to monitor acoustic signals of selected frequencies, a particular limit being required for a particular frequency.

SUMMARY OF THE INVENTION

In the present invention, apparatus is provided for determining the bearing of an acoustic source from a selected location in an acoustic environment. The apparatus includes a plurality of discrete acoustic sensor elements which are distributed along a flexible strength member, having first and second ends, so that the sensor elements are selectively spaced apart from one another along the length of the strength member. The member is deployable in a linear configuration in the environment, and one of the elements, comprising a lead element, is closer to the first end of the member than are any of the other elements. Motion measuring means are coupled to the lead element when the strength member is deployed in the environment to generate signals which indicate the velocity of the lead sensor element in the environment. Processing means, having an input which is limited to the velocity indicating signals, is provided to generate estimates of the positions of respective sensor elements when the flexible member is deployed in the environment at the above-mentioned location, and means coupled to the processing means steers an acoustic detection beam in response to the position estimates to determine the bearing of the source. The acoustic detection beam comprises the combined detection capabilities of the sensor elements.

Preferably, the environment comprises a water environment, and the sensor elements and strength member together comprise an acoustic line array, the first end of the strength member being adapted for attachment to a vessel to enable the array to be selectively moved through the water environment. Preferably also, the motion measuring means comprises means for generating first and second signals to respectively indicate the speed and heading of the lead element at the beginning of each interval in a series of intervals of selected duration, and the processing means comprises means for generating sensor element position estimates at the conclusion of each of the intervals. The position estimates generated at the conclusion of a selected number of intervals are sufficiently accurate to enable the aforementioned acoustic detection beam to determine the bearing of the source to a specified degree of accuracy, for a signal projected by the source which is of specified acoustic frequency.

In a preferred embodiment of the invention, the processing means comprises means structured according to selected parameters to provide the aforementioned position estimates, an important one of the parameters being the drag forces on the array when the array is moved through the water environment. The steering means in such embodiment comprises a series of adjustable delay elements, one coupled to each sensor element, and further comprises means responsive to position estimates which are provided at the conclusion of an interval to adjust the delay element of a given sensor element in order to compensate for any variation of the given sensor element from the positional relationship it has with the other elements of the array when the array is in a linear configuration.

OBJECTS OF THE INVENTION

An object of the present invention is to more simply and more accurately determine the positions of the sensor elements of a beam forming array deployed in an environment, in order to improve the effectiveness of acoustic detection by means of beam forming arrays.

Another object is to provide a system for use with a beam forming array which closely approximates respective element positions, when the array is moving through the environment, by periodically sampling the speed and heading of the leading element of the array, input data required by the system being limited to the speed and heading of the lead element at the beginning of each sampling interval in a series of sampling intervals.

Another object is to provide a system of the above type in which signal processing requirements are substantially reduced.

Another object is to eliminate the port-starboard bearing ambiguity which can arise when a flexible linear beam forming array is used to locate a signal source.

Another array is to provide an improved system for determining the positions of each of the sensor elements of a flexible beam forming array which eliminates the need for deliberately projecting acoustic signals in proximity to the array.

Another object is to provide a flexible array of acoustic sensor elements which may be deployed in a non-linear configuration in an acoustic environment to form a beam having a selected pattern or characteristics.

Another object is to enable a flexible beam forming array to be moved through a body of water at a slower speed than is required to maintain the elements of the array in a selected configuration, whereby noise proximate to the moving array and/or generated by it may be substantially reduced.

Another object is to enable a flexible beam forming array to gather useful acoustic data when it is moving through a non-linear path.

These and other objects of the invention will become more readily apparent from the ensuing specification when taken together with the drawings.

DETAILED DESCRIPTION OF THE PREFERRED EMBODIMENT

Figure 1:
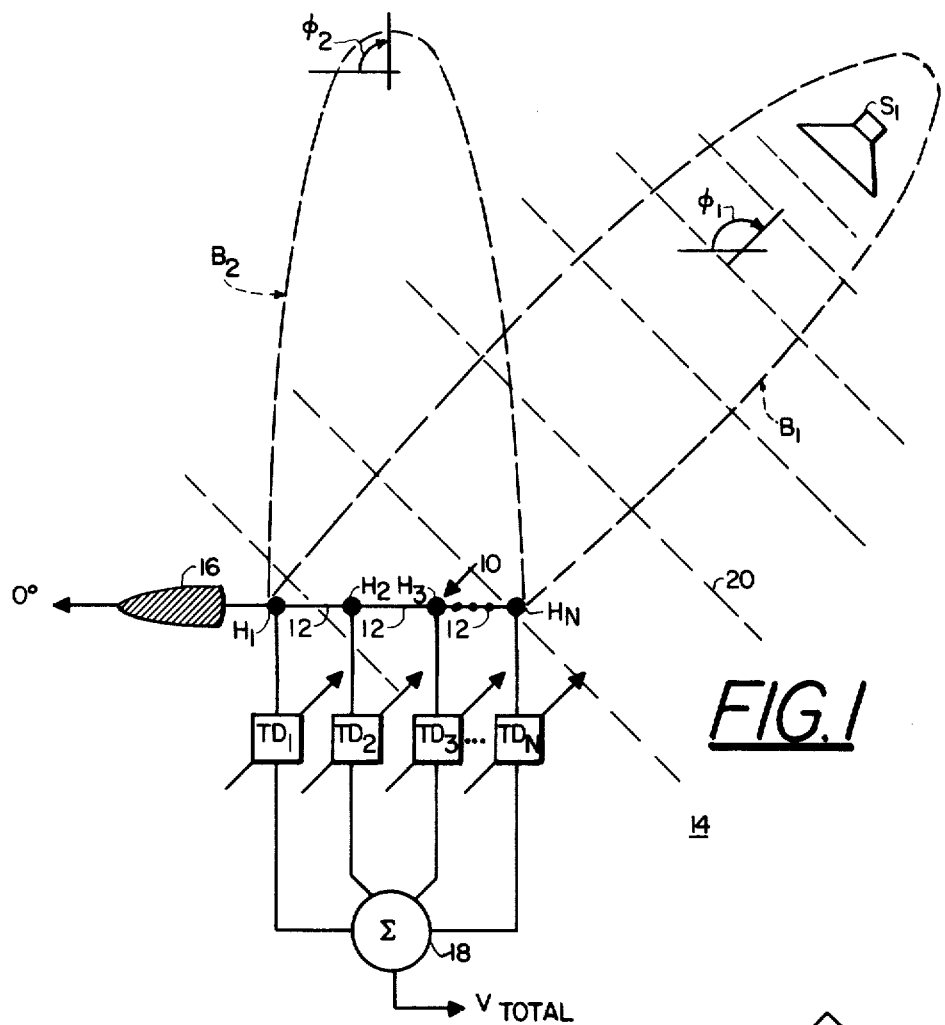
FIG. 1 is a schematic diagram showing a simplified beam forming array having a linear shape and receiving planer acoustic waves from an acoustic signal source.

Referring to FIG. 1, there is shown a beam forming array 10 comprising discrete sensor elements $H_1$-$H_N$, which are coupled together by means of flexible cable or like strength member segments 12 of known length. Discrete sensor elements $H_1$-$H_N$ may comprise individual hydrophones or clusters of hydrophones interconnected to form array 10, according to practices well known in the art, and the array is moved through an ocean body or like acoustic environment 14 by vessel 16. Sensor elements $H_1$-$H_N$ are shown in linear relationship on a line oriented to zero degrees, the heading of vessel 16. Each sensor element $H_1$-$H_N$ is electrically connected, through a respective variable time delay element $TD_1$-$TD_N$, to an adder 18 which provides $V_{total}$, the sum of the amplitudes of the signals sensed by elements $H_1$-$H_N$ at a given point in time.

FIG. 1 further shows a target acoustic signal source $S_1$ oriented at some angle $\phi$, with respect to the orientation of array 10, so that a planar wave front 20 of a signal of particular frequency projected by source $S_1$ is detected at a different time by each of the sensor elements $H_1$-$H_N$, sensor $H_N$ detecting the wave front first and sensor $H_1$ detecting the wave front last. It will be readily apparent that because of the co-linear positioning of sensors $H_1$-$H_N$, and because of the planar nature of wave fronts 20, the same time period T is required for a wave front to travel between any two adjacent sensor elements. Consequently, by adjusting time delay elements $TD_1$-$TD_N$ to delays of (N-1)T, (N-2)T, . . . and zero, respectively, the peak value of $V_{total}$ is maximized.

If a source $S_1$ lies at a bearing of $\phi$ from array 10, a unique set of adjustments of time delay elements $TD_1$-$TD_N$ will correspond to any particular value of $\phi$, $0° < \phi < 180°$, in order to maximize $V_{total}$ when a signal is projected to the array from the source. Consequently, to determine the bearing of a source $S_1$, the delays of elements $TD_1$-$TD_N$ are respectively adjusted in a preselected pattern until $V_{total}$ is maximized, the set of delay values at which maximum $V_{total}$ occurs thereby identifying a particular source bearing $\phi$.

In the art of acoustic beam forming arrays, the process of adjusting delay elements to determine the bearing of a target signal source is known as beam steering. FIG. 1 shows detection beam $B_1$, comprising the signal detection pattern of array 10 steered to a bearing of $\phi_1$, and further shows detection beam $B_2$, the detection pattern of array 10 steered to a bearing of $\phi_2$. It is to be emphasized that since the beam steering process requires proper adjustment of the respective time delay elements, and since time delay adjustment is critically dependent upon sensor element position, it is essential to be able to accurately determine the positions of sensor elements $H_1$-$H_N$, with respect to one another. Positions should generally be known to within one tenth of the wave length of the frequency of a particular signal received from a target source. Given the co-linear relationship of sensor elements $H_1$-$H_N$ in FIG. 1, and given the known length of cable segments therebetween, the positions of sensor elements $H_1H_N$, in relation to one another, may be readily determined. Such positions may be represented in an arbitrary inertial coodinate system by time dependent position vectors $\vec{r_1}(t)$-$\vec{r_n}(t)$, respectively.

Figure 2:
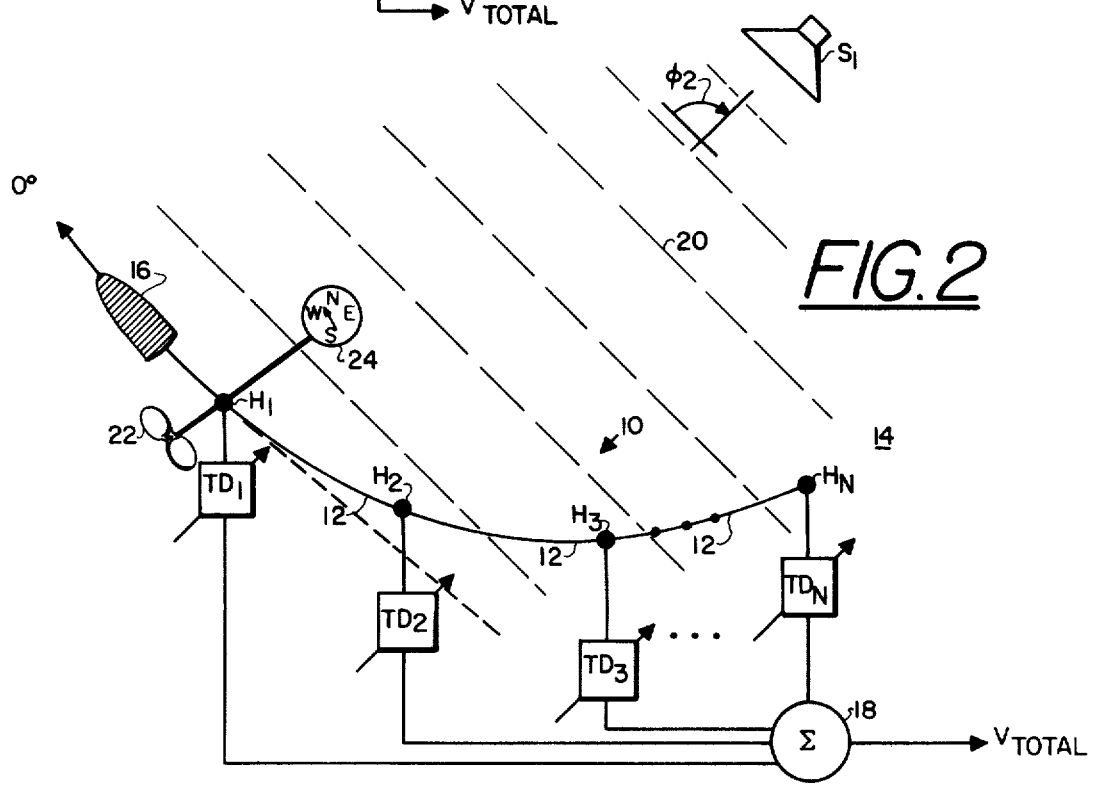
FIG. 2 is a schematic diagram showing a simplified beam forming array having a non-linear shape which receives planar acoustic waves from an acoustic signal source.
Figure 3:
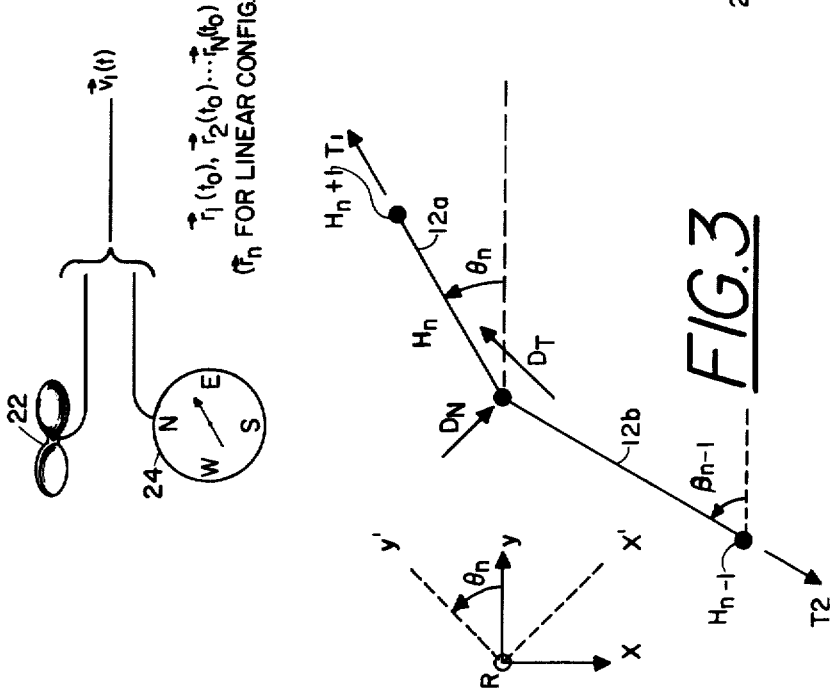
FIG. 3 is a schematic diagram for illustrating the forces which affect the motion of one of the sensor elements of a beam forming array as the array is moved through an acoustic environment such as an ocean body.

Referring to FIG. 2, there is shown beam forming array 10 having a curved rather than a linear shape. Array 10 may have such shape, for example, when vessel 16 is making a turn, or in the presence of strong cross winds or currents. While FIG. 2 shows sensor element $H_1$ still lying on a line oriented to zero degrees, the heading of vessel 16, it is clear that sensor elements $H_2$-$H_N$ are positioned progressively farther from such a line. While the combined sensory capabilities of sensors $H_1H_N$ still form a detection beam, which may be steered by adjustment of the time delay elements to determine the bearing of a signal source, it is very clear that there is no longer any simple or straight forward process for locating respective positions of the sensor elements. When it is considered that a beam forming array may have a length which is on the order of a mile, and may have a very large number of discrete sensor elements distributed along its length, it becomes apparent that beam forming efforts may be substantially degraded if beam forming is carried out on the assumption that the array is in a linear configuration, while it is in face non linear. However, it will also be apparent that if the positions of respective sensor elements are known, in relation to one another, non-linearities may be compensated for by judicious adjustment of respective time delay elements. It has been determined that very acceptable approximations of the respective positions of sensor elements $H_1$-$H_N$ may be provided by means of a lumped mass technique. Therein, it is assumed that the entire mass of array 10 is apportioned into small discrete masses m, one mass m being located at each of the hydrophones $H_1$-$H_N$, adjacent elements being connected by a strength member 12 of no mass. Referring to FIG. 3 in accordance with such assumption, there are shown the primary forces acting on a hydrophone $H_n$ in array 10, such forces including $T_1$ and $T_2$, the respective tensions in cable segments 12a and 12b. Segments 12a and 12b are the cable segments which link any hydrophone $H_n$ to its two adjacent hydrophones $H_{n+1}$ and $H_{n-1}$. Tension forces $T_1$ and $T_2$ at a given time are determined by the respective positions of hydrophones $H_{n+1}$, $H_n$ and $H_{n-1}$ at the particular time, and by the Young's modulus, or spring constant $E_c$, of cable segments 12a and 12b. The positions of hydrophones $H_{n+1}$, $H_n$ and $H_{n-1}$ are specified in an inertial x-y coordinate system, centered at an arbitrary reference point R, as $\vec{r}_{n+1}$, $\vec{r}_n$, and $\vec{r}_{n-1}$, respectively.

Referring further to FIG. 3, there are also shown normal and tangential drag forces $D_N$ and $D_T$, respectively acting on hydrophone $H_n$ to influence the motion thereof. Such drag forces are determined by $\vec{v}_n(t)$, the velocity vector of hydrophone $H_n$, by $d_n$, the diameter of array 10 at hydrophone $H_n$, and by $C_{DN}$ and $C_{DT}$, the normal and tangential drag coefficients.

From the above, it is clear that the time-varying factors which determine $\vec{F}_n(t)$, the total force experienced by a hydrophone $H_n$ as it moves through environment 14, are position vectors $\vec{r}_{n+1}$, $\vec{r}_n$, and $\vec{r}_{n-1}$, and velocity vector $\vec{v}(t)$, or:

$$\vec{F}_n(t) = \vec{F}[\vec{r}_{n+1}(t), \vec{r}_n(t), \vec{r}_{n-1}(t), \vec{v}_n(t)] \qquad \text{Eqn. 1}$$

It is anticipated that one or more forms of a suitable function $\vec{F}_n(t)$ will be apparent to one of skill in the art. To determine one form thereof, reference may once again be made to FIG. 3, which shows sensor element $H_{n+1}$ rotated at an angle of $\theta_n$ from element $H_n$, $\theta_n$ being expressible as:

$$\theta_n = \tan^{-1}\left[\frac{-(x_{n+1} - x_n)}{y_{n+1} - y_n}\right] \qquad \text{Eqn. 2}$$

where $x_n$ and $y_n$ are the x and y coordinates of $H_n$, and $x_{n+1}$ and $y_{n+1}$ are the x and y coordinates of $H_{n+1}$. $\hat{i}$ and $\hat{j}$ are unit vectors along the x and y axes, respectively. Tension $T_1$ is calculated from the Young's modulus $E_{cn}$ and the strain. The unstretched length of segment 12a is $\Delta L_1$. The stretched length is calculated from the displacements so that the expression for tension $T_1$ is:

$$T_1 = \left[\frac{\pi d_n^2}{4}\right] \frac{E_{cn}}{\Delta L_1}\left[\sqrt{(x_{n+1} - x_n)^2 + (y_{n+1} - y_n)^2} - \Delta L_1\right] \qquad \text{Eqn. 3}$$

The tension vector in inertial coordinates is given by:

$$\vec{T}_1 \sin\theta_n \hat{i} + T_1 \cos\theta_n \hat{j} \qquad \text{Eqn. 4}$$

Similarly:

$$\vec{T}_2 = T_2 \sin\theta_{n-1} \hat{i} + T_2 \cos\theta_n \hat{j} \qquad \text{Eqn. 5}$$

In order to calculate drag forces, it is necessary to define cable coordinates for $H_n$. This is done by rotating the inertial x and y axes through the angle $\theta_n$, to define an axis x', normal to cable segment 12a, and an axis y', tangent to cable segment 12a. The velocity of water relative to hydrophone $H_n$ may be defined as:

$$\begin{bmatrix} U_{Rn} \\ V_{Rn} \end{bmatrix} = \begin{bmatrix} -\dot{x}_n \\ -\dot{y}_n \end{bmatrix}, \qquad \text{Eqn. 6}$$

where it is assumed that there are no currents. This vector is transformed to cable coordinates x', y' as:

$$\begin{bmatrix} U_{Rn}' \\ V_{Rn}' \end{bmatrix} = \begin{bmatrix} -\dot{x}_n \cos\theta_n - \dot{y}_n \sin\theta_n \\ \dot{x}_n \sin\theta_n - \dot{y}_n \cos\theta_n \end{bmatrix} \qquad \text{Eqn. 7}$$

Normal drag component $D_N$ may therefore be expressed as:

$$D_N = \tfrac{1}{2} \rho_w d_n C_{DN} U_{R'n} |U_{R'n}| \qquad \text{Eqn. 8}$$

and tangential drag component $D_T$ may be expressed as:

$$D_T = \tfrac{1}{2} \rho_w \pi d C_{DT} V_{R'n} |V_{R'n}| \qquad \text{Eqn. 9}$$

where $\rho_w$ is the density of water.

Additional hydrodynamic forces comprise the product of the acceleration and the mass of water displaced in the direction of motion, where:

$$m_{hx'} = \pi \rho_w [d_n/2]^2 \qquad \text{Eqn. 10}$$

and $$m_{hy'} = 0 \qquad \text{Eqn. 11}$$

The total hydrodynamic forces on hydrophone $H_n$ is therefore expressible in inertial coordinates as:

$$X_n = \left[ D_N - m_{hx'n}\frac{d^2x_n}{dt^2} \right] \cos\theta_n - D_T \sin\theta_n, \quad \text{Eqn. 12}$$

and $$Y_n = \left[ D_N - m_{hx'n}\frac{d^2x_n}{dt^2} \right] \sin\theta_n + D_T \cos\theta_n. \quad \text{Eqn. 13}$$

From equation 4, 5, 12 and 13, the total force $\vec{F}_n(t)$ on hydrophone $H_n$ is expressible as:

$$\vec{F}_n(t) = [T_1 \sin\theta_n + T_2 \sin\theta_{n-1} + X_n] i + [T_1 \cos\theta_n + T_2 \cos_{n-1} + Y_n] j \quad \text{Eqn. 14}$$

If $\vec{F}_n(t)$ is the total force on sensor element $H_n$ at time $t_0$ and $\vec{v}_n(t_0)$ is the velocity vector thereof, then, from the conservation of momentum, the momentum of mass m at element $H_n$ at time $t_0 + \Delta t$ is:

$$m \vec{v}_n(t_0 + \Delta t) = m \vec{v}_n(t_0) + \int_{t_0}^{t_0+\Delta t} \vec{F}_n[\vec{r}_{n+1}(t), \vec{r}_n(t), \vec{r}_{n-1}(t), \vec{v}(t)] dt \quad \text{Eqn. 15}$$

If $\Delta t$ is sufficiently small, equation 14 is usefully approximated by the expression:

$$m \vec{v}_n(t_0 + \Delta t) = m \vec{v}_n(t_0) + \vec{F}_n[\vec{r}_{n+1}(t), \vec{r}_n(t), \vec{r}_{n-1}(t), \vec{v}(t)]\Delta t \quad \text{Eqn. 16}$$

A useful approximation for $\vec{r}_n(t_0 + \Delta t)$ is provided by the expression:

$$\vec{r}_n(t_0 + \Delta t) = \vec{r}_n(t_0) + \vec{v}_n(t_0)\Delta t \quad \text{Eqn. 17}$$

Equations 16 and 17 indicate that if the velocity and position vectors $\vec{v}_n$ and $\vec{r}_n$ of respective sensor elements $H_1$-$H_N$ are known at a time $t_0$, then the positions at the end of an interval $\Delta t$ may be readily determined. In general, the position of element $H_n$ at a time $t_0 + m\Delta t$, $m = 1, 2, 3 \ldots$, is readily determinable from information provided at time $t_0 + (m-1)\Delta t$. However, it is still necessary to provide boundry condition, i.e., respective values of $\vec{v}_n(t_0)$ and $\vec{r}_n(t_0)$, for each sensor element $H_1$-$H_n$.

In order to provide such boundry conditions, array 10 is assumed to be in a linear configuration at time $t_0$. Velocity $\vec{v}_1(t_0)$ of sensor element $H_1$, the leading element of array 10, is obtained from direct measurement by attaching speed and heading sensors thereto, and all of the elements are assumed to be moving on the same line at $t_0$. Consequently, the velocity of each element at $t_0$ may be assumed to be equal to $v_1(t_0)$.

An additional assumption is that sensor element $H_n$ is placed at the extreme end of array 10, so that the only sensor element adjacent thereto is element $H_{N-1}$. Consequently, force $T_1$ on element $H_N$ is 0.

Figure 4:
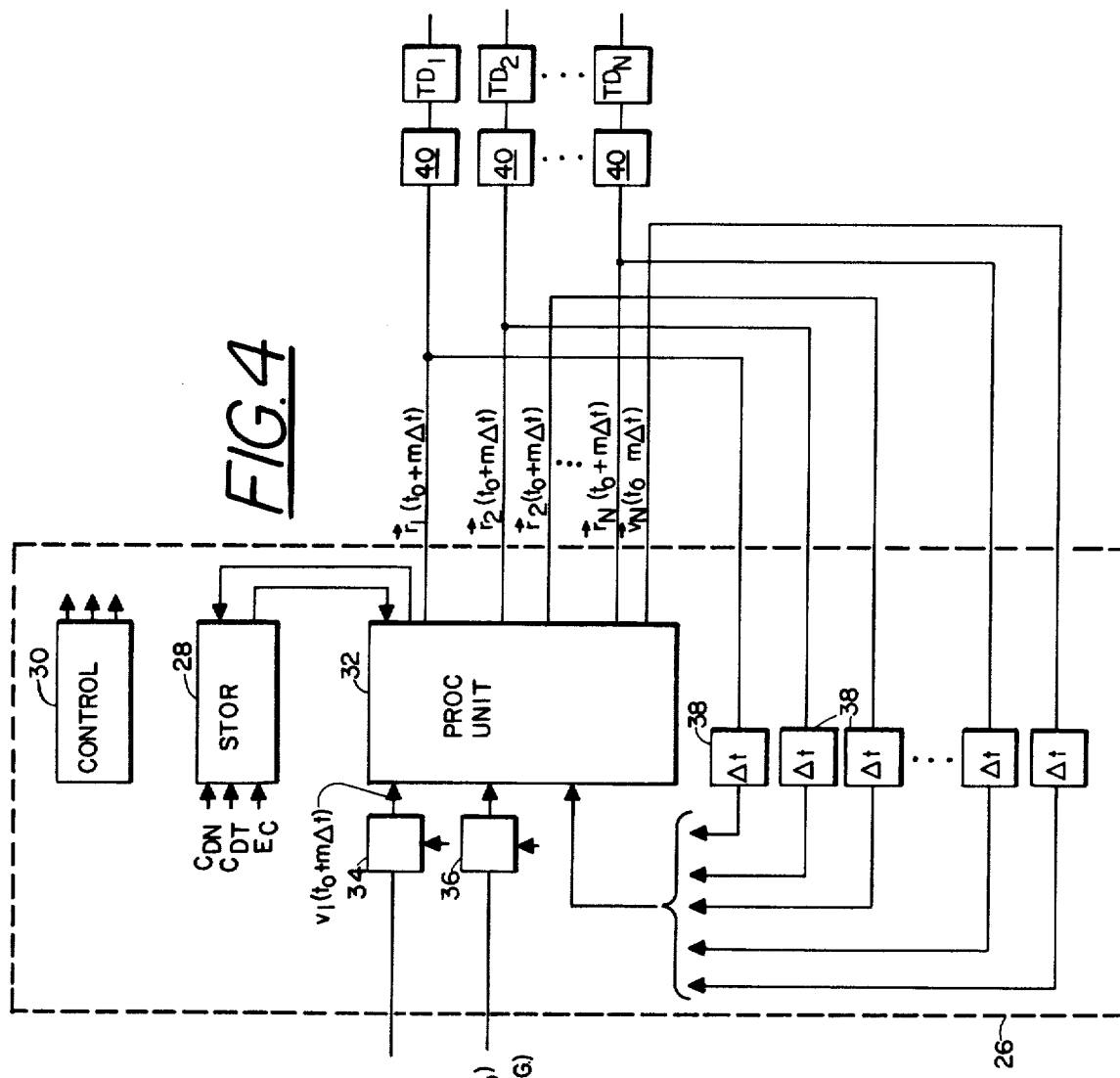
FIG. 4 is a block diagram showing an embodiment of the invention.

Referring to FIG. 4, there are shown sensor devices 22 and 24, which are mountable on array 10 at the position therealong of sensor element $H_1$. Device 22 is provided to monitor the speed of element $H_1$, and device 24 is provided to monitor the heading thereof in environment 14, so that the outputs of sensor devices 22 and 24 together provide element $H_1$ velocity $\vec{v}_1(t)$. Such velocity information is coupled to a processor 26, the principal components thereof comprising a storage 28, a control 30, and a processing unit 32.

Processing unit 32 comprises a computing device structured to solve equations 16 and 17 for specific values of $\vec{r}_n(t_0 + \Delta t)$ and $\vec{v}_n(t_0 + \Delta t)$ when specific values of $\vec{v}_n(t_0)$, $\vec{r}_{n-1}(t_0)$, $\vec{r}_n(t_0)$ and $\vec{r}_{n+1}(t_0)$ are coupled thereto, along with other required parameters. For example, unit 32 could comprise the central processor of a digital computer, storage 28 and control 30 respectively comprising the storage and control elements of the computer. If a programmable general purpose computer were to be employed for processor 26, a suitable program for operating such computer could be prepared by one of skill in the art simply by referring to equations 3, 5 and 12-14, and designing a program which implements the various mathematical operations indicated thereby in a sequence which is readily apparent therefrom.

Alternatively, processor 26 could comprise a hardwired special purpose digital computer. The respective components therefor, and their interconnection, would be readily apparent to one of skillin the art from equations 3, 5 and 12-14.

At a time $t_0$, control 30 operates a switch 34 to couple a value $\vec{v}_1(t_0)$ to processing unit 32, $\vec{v}_1(t_0)$ being the velocity vector of leading element $H_1$ at time $t_0$, as measured by sensors 22 and 24. Also at time $t_0$, control 30 operates a switch 36 to couple a set of position vectors $\vec{r}_1(t_0), \vec{r}_2(t_0), \ldots \vec{r}_N(t_0)$, to unit 32, which indicate the respective positions of sensor elements of array 10 when array 10 is in the aforementioned linear configuration.

Processing unit 32 is thereupon directed by control 30 to calculate position and velocity vectors $\vec{r}_n(t_0 + \Delta t)$ and $\vec{v}_n(t_0 + \Delta t)$ for each sensor element $H_n$, according to the aforementioned equations. Each such position vector comprises an estimate of what the position of a sensor element $H_n$ will be at time $t_0 + \Delta t$, and each velocity vector comprises an estimate of what the velocity of element $H_n$ will be at time $t_0 + \Delta t$.

Referring further to FIG. 4, there are shown vector quantities $\vec{r}_1(t_0 + \Delta t) - \vec{r}_N(t_0 + \Delta t)$ and $\vec{v}_2(t_0 + \Delta t) - \vec{v}_N(t_0 + \Delta t)$ coupled through respective time-delay elements 38 to processing unit 32. At time $t_0 + \Delta t$, such quantities are employed to solve equations 16 and 17 to provide estimates of respective element positions and velocities at time $t_0 + 2\Delta t$. Also at time $t_0 + \Delta t$, the velocity of leading element $H_1$ is again sampled or measured, so that the actual value of $v_1(t_0 + \Delta t)$ is used by processing unit 32 in determining respective $\vec{r}_n(t_0 + 2\Delta t)$ and $\vec{v}_n(t_0 + 2\Delta t)$ estimates.

Processor 26 is operated to perform successive position estimation cycles of the above type, the cycles having a duration $\Delta t$. $\Delta t$ is usefully on the order of 3-5 seconds. In general, at each time $t_0 + m \Delta t$, processor 26 provides estimates of what the positions and velocities of respective sensor elements $H_1$-$H_N$ will be at a time $t_0 + (m+1) \Delta t$. The input data used by processor 26 in providing such information comprises the actual measured velocity of lead element $H_1$ at time $t_0 + m \Delta t$, and the position estimates $r_1(t_0 + m \Delta t) - r_N(t_0 + m \Delta t)$ and velocity estimates $v_2(t_0 + m \Delta t) - v_N(t_0 + m \Delta t)$, which were determined by processor 26 during the cycle commencing at $t_0 + (m-1)\Delta t$.

As processor 26 is operated over a succession of cycles, the accuracy provided by successive actual measurements of lead element $H_1$ is propagated down the array. It is anticipated that by the time array 10 has been towed a distance equal to several array lengths, the sensor element position estimates provided by processor 26 will be sufficiently close to the respective actual positions of the elements that such estimates may be used when array 10 is employed in acoustic detection operations.

Referring once again to FIG. 4, there is shown each position estimate $r_n$ coupled to a time-delay adjust element 40, which is in turn coupled to time-delay element $TD_n$. Each delay adjust element 40 comprises an electrical device which is structured so that a unique value of $r_n$ coupled thereto causes a corresponding unique signal to be coupled to its time-delay element, $TD_n$ adjusting the delay of $TD_n$ to compensate for the variation of sensor element $H_n$ from the position it would have if it was co-linear with the other sensor elements of array 10.

Obviously, many modifications and variations of the present invention are possible in the light of the above teachings, and, it is therefore understood that within the scope of the disclosed inventive concept, the invention may be practiced otherwise than as specifically described.

We claim:

1. Apparatus for determining the bearing of an acoustic source from a selected location in an acoustic environment, said apparatus comprising:
   a plurality of discrete acoustic sensor elements;
   a flexible strength member, having first and second ends, which may be deployed in a linear configuration in said environment, said sensor elements being attached along said strength member in spaced apart relationship, one of said elements, comprising a lead element, being closer to said first end than any other of said elements;
   motion measuring means coupled to said lead element when said member is deployed in said environment for generating signals which indicate the velocity of said lead sensor element in said environment;
   processing means for generating estimates of positions of respective sensor elements when said strength member is deployed in said environment in said location, physically measured data required for said estimates being limited to said velocity indicating signals; and
   means coupled to said processing means for steering an acoustic detection beam in response to said position estimates to determine the bearing of said source, said acoustic detection beam comprising the combined detection capabilities of said sensor elements.

2. The apparatus of claim 1 wherein said environment comprises a water environment, and wherein:
   said sensor elements and said flexible strength member together comprise an acoustic line array, said first end of said strength member being adapted for attachment to a vessel to enable said array to be selectively moved through said water environment;
   said motion measuring means comprises means for generating first and second signals to respectively indicate the speed and heading of said lead element at the beginning of each interval in a succession of intervals of selected length; and
   said processing means comprises means for generating, during one of said intervals, estimates of what the positions of respective sensor elements will be at the beginning of the next interval in said succession.

3. The apparatus of claim 2 wherein:
   said processing means comprises means for generating position estimates at the conclusion of a selected number of said intervals which are sufficiently accurate to enable said acoustic detection beam to determine the bearing of said source to within a specified degree of accuracy, for a signal projected by said source of specified acoustic frequency.

4. The apparatus of claim 2 wherein:
   said processing means comprises means structured to determine the force acting upon one of said sensor elements at the beginning of one of said intervals, and to employ said force information to estimate what the position of said sensor element will be at the beginning of the next interval in said succession.

5. The apparatus of claim 4 wherein:
   said line array comprises a series of hydrophones selectively distributed along the length of a cable means; and
   said processing means comprises means structured to commence operation at the beginning of a given one of said intervals to generate estimates of what the positions and velocities of each of said hydrophones will be at the beginning of the interval following said given interval, said position and velocity estimates being generated on the basis of velocity indicating signals generated by said motion measuring means at the beginning of said given interval, and of position and velocity estimates generated by said processing means during the interval preceding said given interval.

6. The apparatus of claim 5 wherein:
   said processing means comprises means structured to commence operation at the beginning of a first interval of said succession of intervals when the array is in a linear configuration for generating estimates of what the positions and the velocities of respective hydrophones will be at the beginning of a second interval, said second interval position and velocity estimates being generated on the basis of velocity indicating signals generated by said motion measuring means at the beginning of said first interval, and of estimates of the positions of said hydrophones in relation to one another when said array is in said linear configuration.

7. The apparatus of claim 6 wherein:
   said motion measuring means comprises speed and heading sensors capable of being joined to said lead element for respectively generating speed and heading signals at the beginning of each of said intervals, the speed and heading signals generated at the beginning of a given one of said intervals comprising the velocity of said lead element at the beginning of said given interval.

8. The apparatus of claim 2 wherein said steering means comprises:
   a series of adjustable delay elements, each of said delay elements coupled to one of said sensor elements; and
   means responsive to one of said position estimates for adjusting a corresponding one of said delay elements to compensate for the variation of the sensor element coupled to said corresponding delay element from the position the element would have if it was in a co-linear relationship with all of the other sensor elements.

9. Apparatus for determining the respective positions of the sensor elements of an acoustic beam forming array, said apparatus comprising:

motion measuring means joinable to a leading element of said array, when said array is moved through a water environment, for measuring the velocity of said leading element at the beginning of each cycle in a series of updating cycles of selected time length; and processing means coupled to said motion measuring means for operating during a given one of said cycles to provide estimates of what the respective positions of said sensor elements will be at the beginning of the cycle following said given cycle, input data received by said processing means being limited to measured velocities of said leading element.

10. The apparatus of claim 9 wherein:

said motion measuring means comprises means joinable to said array at the location on the array of said leading element to generate signals which indicate the speed and heading of said leading element at the beginning of each of said cycles; and said processing means comprises means for generating estimates of what the positions and velocities of respective sensor elements will be at the beginning of the cycle following said given cycle, said estimates being generated on the basis of the speed and heading signals generated at the beginning of said given cycle, on the position estimates of all the elements generated during the cycle preceding said given cycle, and on the velocity estimates of all the elements except said leading element which are generated during said preceding cycle.

11. A method for operating an acoustic beam forming detection system comprising a flexible linear array of discrete acoustic sensor elements, and delay elements respectively coupled to the elements, said method comprising the steps of:

moving said array through a water environment;

measuring the velocity of the leading element of said array at the beginning of an initial cycle of selected time duration;

estimating what the positions and velocities of each of the elements will be at the conclusion of said initial cycle, said initial cycle estimates being based upon the assumptions that said array is in a linear configuration at the beginning of said initial cycle, so that the positions of the sensor elements with respect to one another are known, and that the velocities of each of said sensor elements at the beginning of said initial cycle are equal;

measuring the velocity of said leading element at the beginning of an updating cycle of said selected time duration, said updating cycle commencing upon the conclusion of said initial cycle;

estimating what the positions and velocities of each of said sensor elements will be at the conclusion of said updating cycle on the basis of the measured velocity of said leading element at the beginning of said updating cycle, and on the basis of position and velocity estimates made during said initial cycle; and continuing a succession of said updating cycles until estimates of the positions of said sensor elements are provided which are sufficiently close to the respective actual positions of the sensor elements that said array may be employed to detect the bearing of an acoustic signal source to within a selected degree of error.

12. The method of claim 11 wherein:

said method includes the step of adjusting the delay provided by one of said delay elements in direct relationship to the estimate of the position of one of said sensor elements which is provided during one of said updating cycles.

* * * * *